US012678978B2

(12) United States Patent　　　(10) Patent No.:　US 12,678,978 B2

Jiang et al.　　　(45) Date of Patent:　Jul. 14, 2026

(54) ADHESION DEVICE AND ROBOT

(71) Applicants:SHANGHAI FLEXIV ROBOTICS TECHNOLOGY CO., LTD., Shanghai (CN); FLEXIV LTD., Grand Cayman (GB)

(72) Inventors: Hao Jiang, Santa Clara, CA (US); Wenbin Li, Santa Clara, CA (US)

(73) Assignees: SHANGHAI FLEXIV ROBOTICS TECHNOLOGY CO., LTD., Shanghai (CN); FLEXIV LTD., Grand Cayman (KY)

( * ) Notice: Subject to any disclaimer, the term of this patent is extended or adjusted under 35 U.S.C. 154(b) by 114 days.

(21) Appl. No.: 18/564,430

(22) PCT Filed: Mar. 13, 2023

(86) PCT No.: PCT/CN2023/080998

§ 371 (c)(1),
(2) Date: Nov. 27, 2023

(87) PCT Pub. No.: WO2024/187332

PCT Pub. Date: Sep. 19, 2024

(65) Prior Publication Data

US 2025/0073924 A1　Mar. 6, 2025

(51) Int. Cl.
　B25J 15/00　　　(2006.01)
　B25J 15/06　　　(2006.01)
(52) U.S. Cl.
　CPC ......... B25J 15/008 (2013.01); B25J 15/0683 (2013.01)

(58) Field of Classification Search
　CPC .. B25J 15/008; B25J 15/0683; B25J 15/0085; F16B 5/07; F16B 11/006; F16B 47/00
　See application file for complete search history.

(56) References Cited

U.S. PATENT DOCUMENTS 5,551,525 A * 9/1996 Pack .................... B62D 57/032
　　　　　　　　　　　　　　　　180/8.1
5,839,532 A * 11/1998 Yoshiji ................... B62D 57/00
　　　　　　　　　　　　　　　　180/164

(Continued)

FOREIGN PATENT DOCUMENTS

CN　　206171598 U　　5/2017
CN　　109533960 A　　3/2019
(Continued)

OTHER PUBLICATIONS

PCT International Search Report and Written Opinion for Corresponding PCT Application No. PCT/CN2023/080998, mailed Nov. 15, 2023, 6 pages.

(Continued)

*Primary Examiner* — Bhavesh V Amin

(74) *Attorney, Agent, or Firm* — Dority & Manning, PA

(57) ABSTRACT

The present disclosure relates to an adhesion device and a robot having the adhesion device. The adhesion device includes a substrate, an inner surface of the substrate being configured to be in contact with an object to be adhered; a directional dry adhesive layer provided on the inner surface of the substrate, the directional dry adhesive layer having a plurality of inclined micro-wedge structures; and an adhesion layer provided on the inner surface of the substrate and surrounding the directional dry adhesive layer.

17 Claims, 5 Drawing Sheets

(56) References Cited

U.S. PATENT DOCUMENTS

| | | | | |
|---|---|---|---|---|
| 6,737,160 B1 * | 5/2004 | Full | C09J 5/00 | 428/397 |
| 6,872,439 B2 * | 3/2005 | Fearing | F16B 2/005 | 264/222 |
| 7,762,362 B2 * | 7/2010 | Cutkosky | B62D 57/024 | 180/8.5 |
| 7,780,810 B2 * | 8/2010 | Hamano | G02C 5/126 | 156/247 |
| 7,785,422 B2 * | 8/2010 | Autumn | B81C 99/002 | 134/32 |
| 8,236,129 B2 * | 8/2012 | Xie | C09J 9/00 | 156/499 |
| 8,325,458 B2 * | 12/2012 | Prahlad | B25J 15/0085 | 361/234 |
| 8,815,385 B2 * | 8/2014 | Fearing | C09J 7/00 | 428/323 |
| 8,861,171 B2 * | 10/2014 | Prahlad | B25J 15/00 | 361/234 |
| 9,415,519 B2 * | 8/2016 | Pergande | B25J 15/0085 | |
| 9,440,359 B2 * | 9/2016 | Spicer | B25J 15/008 | |
| 9,505,955 B1 * | 11/2016 | Krahn | C09J 9/02 | |
| 9,517,610 B2 * | 12/2016 | Parness | B25J 15/008 | |
| 9,623,570 B1 * | 4/2017 | Krahn | B25J 15/0085 | |
| 9,704,126 B1 * | 7/2017 | Wellman | B25J 15/0014 | |
| 9,815,261 B2 * | 11/2017 | Browne | B25J 15/008 | |
| 9,971,989 B2 * | 5/2018 | Wellman | B25J 15/0061 | |
| 10,155,318 B2 * | 12/2018 | Dadkhah Tehrani | C09J 9/02 | |
| 10,220,520 B2 * | 3/2019 | Hawkes | B25J 15/008 | |
| 10,240,070 B1 * | 3/2019 | Humfeld | C09J 1/00 | |
| 10,316,220 B2 * | 6/2019 | Hawkes | C09J 7/22 | |
| 10,357,883 B1 * | 7/2019 | O'Connor | B25J 15/0616 | |
| 10,576,626 B2 * | 3/2020 | Rose | B25J 9/1612 | |
| 10,647,004 B2 * | 5/2020 | Hawkes | B25J 15/0085 | |
| 10,821,611 B1 * | 11/2020 | DeFant | B25J 15/0625 | |
| 10,875,190 B2 * | 12/2020 | Cutkosky | B25J 19/021 | |
| 10,875,194 B1 * | 12/2020 | Coleman | B25J 15/0683 | |
| 11,167,426 B2 * | 11/2021 | Jiang | B25J 15/008 | |
| 11,357,145 B2 * | 6/2022 | Liu | H05K 13/0404 | |
| 11,511,442 B2 * | 11/2022 | Song | B25J 15/008 | |
| 11,534,926 B2 * | 12/2022 | Dadkhah Tehrani | B81C 1/00 | |
| 11,565,429 B2 * | 1/2023 | Russell | B25J 15/08 | |
| 11,660,731 B2 * | 5/2023 | Cui | B29C 33/42 | 264/219 |
| 11,964,386 B2 * | 4/2024 | Geyer | B25J 15/0683 | |
| 12,070,850 B1 * | 8/2024 | Coleman | B25J 15/0616 | |
| 12,076,851 B2 * | 9/2024 | Tian | B25J 15/008 | |
| 12,226,895 B1 * | 2/2025 | Nambi | B25J 15/0009 | |
| 12,263,578 B2 * | 4/2025 | Allen | B25J 15/0683 | |
| 12,311,550 B2 * | 5/2025 | Smith | B25J 19/02 | |
| 12,365,816 B2 * | 7/2025 | Kim | C09J 163/00 | |
| 2003/0208888 A1 * | 11/2003 | Fearing | C09J 7/00 | 24/442 |
| 2004/0240972 A1 * | 12/2004 | Mori | B65G 49/068 | 414/222.01 |
| 2005/0011685 A1 * | 1/2005 | Takenaka | B62D 57/032 | 180/8.6 |
| 2006/0005362 A1 * | 1/2006 | Arzt | B29C 59/16 | 428/141 |
| 2006/0078725 A1 * | 4/2006 | Fearing | B81C 1/00111 | 428/323 |
| 2006/0130294 A1 * | 6/2006 | Adams | A44B 18/0046 | 24/442 |
| 2006/0202355 A1 * | 9/2006 | Majidi | B82Y 30/00 | 428/92 |
| 2007/0289786 A1 * | 12/2007 | Cutkosky | B62D 57/024 | 254/133 R |
| 2008/0025822 A1 * | 1/2008 | Kim | H10P 72/7602 | 414/800 |
| 2008/0070002 A1 * | 3/2008 | Majidi | C09J 9/00 | 428/141 |
| 2010/0296903 A1 * | 11/2010 | Shah | H10P 72/78 | 414/800 |
| 2011/0117321 A1 * | 5/2011 | Menon | C09J 7/00 | 428/156 |
| 2011/0193362 A1 * | 8/2011 | Prahlad | B25J 15/00 | 294/81.2 |
| 2012/0295068 A1 * | 11/2012 | Cutkosky | B29C 37/0053 | 428/167 |
| 2012/0330453 A1 * | 12/2012 | Samak Sangari | B25J 15/0616 | 700/121 |
| 2013/0108409 A1 * | 5/2013 | Wu | B25J 15/0616 | 414/800 |
| 2013/0242455 A1 * | 9/2013 | Prahlad | B25J 15/0009 | 361/234 |
| 2014/0036404 A1 * | 2/2014 | Prahlad | H02N 13/00 | 361/234 |
| 2014/0065347 A1 * | 3/2014 | Sitti | A44B 18/0049 | 428/92 |
| 2014/0227473 A1 * | 8/2014 | Parness | B25J 15/0052 | 428/101 |
| 2014/0272272 A1 * | 9/2014 | Spenko | B29C 39/10 | 428/113 |
| 2015/0086791 A1 * | 3/2015 | Browne | B32B 15/04 | 156/60 |
| 2015/0360370 A1 * | 12/2015 | Mazzocco | B25J 15/0616 | 294/119.1 |
| 2016/0001449 A1 * | 1/2016 | Pergande | B25J 15/0085 | 156/60 |
| 2016/0029437 A1 * | 1/2016 | Grohmann | B25J 15/06 | 219/486 |
| 2016/0052144 A1 * | 2/2016 | Spicer | B25J 15/008 | 294/212 |
| 2016/0052145 A1 * | 2/2016 | Spicer | B23Q 3/1543 | 269/8 |
| 2016/0075036 A1 * | 3/2016 | Lessing | B25J 15/12 | 294/119.3 |
| 2016/0200945 A1 * | 7/2016 | Hawkes | C09J 7/00 | 428/172 |
| 2016/0200946 A1 * | 7/2016 | Hawkes | C09J 183/04 | 428/354 |
| 2016/0361821 A1 * | 12/2016 | Lessing | B25J 15/0023 | |
| 2017/0036355 A1 * | 2/2017 | Lessing | B25J 15/12 | |
| 2017/0066136 A1 * | 3/2017 | Charalambides | G01L 1/146 | |
| 2017/0066138 A1 * | 3/2017 | Hawkes | B64C 25/52 | |
| 2017/0087718 A1 * | 3/2017 | Wagner | B25J 15/0658 | |
| 2017/0203443 A1 * | 7/2017 | Lessing | B25J 15/10 | |
| 2017/0291806 A1 * | 10/2017 | Lessing | B65C 3/26 | |
| 2018/0053144 A1 * | 2/2018 | Wellman | B65G 47/90 | |
| 2018/0207809 A1 * | 7/2018 | Bosboom | B25J 15/0253 | |
| 2018/0215049 A1 * | 8/2018 | Bogner | B25J 15/0683 | |
| 2018/0264657 A1 * | 9/2018 | Dadkhah Tehrani | B81C 1/00206 | |
| 2018/0290393 A1 * | 10/2018 | Bloch | B32B 37/06 | |
| 2018/0298928 A1 | 10/2018 | Farland et al. | | |
| 2019/0039252 A1 * | 2/2019 | Nieratschker | B25J 15/0683 | |
| 2019/0061169 A1 * | 2/2019 | Jiang | B32B 27/281 | |
| 2019/0143532 A1 * | 5/2019 | Cutkosky | B25J 15/008 | 294/212 |
| 2019/0168396 A1 * | 6/2019 | Leidenfrost | B25J 9/1697 | |
| 2019/0176342 A1 * | 6/2019 | Hawkes | B25J 15/0085 | |
| 2019/0202070 A1 * | 7/2019 | Nakagawa | B25J 9/1612 | |
| 2019/0344447 A1 * | 11/2019 | Wicks | B25J 15/0691 | |
| 2019/0344448 A1 * | 11/2019 | Wicks | B25J 9/0093 | |
| 2020/0039092 A1 * | 2/2020 | Reinhold | B25J 15/0052 | |
| 2020/0061844 A1 * | 2/2020 | Jiang | B25J 15/0266 | |
| 2020/0061845 A1 * | 2/2020 | Song | B25J 15/008 | |
| 2020/0068757 A1 * | 2/2020 | Hughes | H05K 13/0404 | |
| 2020/0206953 A1 * | 7/2020 | Bosboom | B25J 15/0666 | |
| 2020/0206954 A1 * | 7/2020 | Bosboom | B25J 15/0683 | |
| 2020/0262069 A1 * | 8/2020 | Douglas | B65G 47/918 | |
| 2020/0269429 A1 * | 8/2020 | Chavez | B25J 9/1687 | |
| 2020/0277518 A1 * | 9/2020 | Arai | F16B 47/00 | |
| 2020/0338750 A1 * | 10/2020 | Alizadehyazdi | B06B 1/0662 | |
| 2020/0353628 A1 * | 11/2020 | Russell | B25J 11/0045 | |
| 2020/0377314 A1 * | 12/2020 | Ikeda | B65G 47/918 | |
| 2021/0120711 A1 * | 4/2021 | Liu | H05K 13/0404 | |
| 2021/0205103 A1 * | 7/2021 | Xiao | B25J 9/1075 | |
| 2021/0221002 A1 * | 7/2021 | Bader | B25J 13/08 | |
| 2021/0245371 A1 * | 8/2021 | Crivella | B25J 15/0095 | |

(56) References Cited

U.S. PATENT DOCUMENTS

| | | | | |
|---|---|---|---|---|
| 2021/0283780 | A1* | 9/2021 | Kilibarda | B25J 9/163 |
| 2021/0308875 | A1* | 10/2021 | Gealy | B25J 15/0683 |
| 2021/0310263 | A1* | 10/2021 | Zhang | B25J 9/1697 |
| 2021/0363388 | A1* | 11/2021 | Kim | C09J 163/00 |
| 2022/0024057 | A1* | 1/2022 | Yap | B25J 15/0028 |
| 2022/0143838 | A1* | 5/2022 | Yamada | B25J 11/0095 |
| 2022/0161445 | A1* | 5/2022 | Larouche | B25J 15/0616 |
| 2022/0184818 | A1* | 6/2022 | St-Hilaire | B25J 15/0616 |
| 2022/0234173 | A1* | 7/2022 | Cui | B29C 33/3842 |
| 2022/0262668 | A1* | 8/2022 | Gleissner | H10P 72/78 |
| 2022/0297312 | A1* | 9/2022 | Baek | B25J 9/1612 |
| 2022/0314460 | A1* | 10/2022 | Sun | B25J 15/0683 |
| 2022/0330778 | A1* | 10/2022 | Vezina | B62D 57/04 |
| 2022/0395987 | A1* | 12/2022 | Hvass | B25J 17/0225 |
| 2023/0067742 | A1* | 3/2023 | Kalouche | B25J 19/023 |
| 2023/0092690 | A1* | 3/2023 | Keraly | B25J 15/0683 |
| | | | | 700/259 |
| 2023/0256601 | A1* | 8/2023 | Ku | B25J 9/1605 |
| | | | | 700/250 |
| 2023/0331416 | A1* | 10/2023 | Matl | B25J 15/0616 |
| 2024/0017940 | A1* | 1/2024 | Lovett | B65G 61/00 |
| 2024/0018942 | A1* | 1/2024 | Sadeghian | F03D 17/004 |
| 2024/0030863 | A1* | 1/2024 | Brulo | B66C 1/24 |
| 2024/0058971 | A1* | 2/2024 | Guo | B25J 15/083 |
| 2024/0149460 | A1* | 5/2024 | Matl | B25J 9/1679 |
| 2024/0165828 | A1* | 5/2024 | Churchill | B25J 15/0028 |
| 2024/0335959 | A1* | 10/2024 | Nain | B25J 15/0014 |
| 2024/0367330 | A1* | 11/2024 | Churchill | B25J 17/0225 |
| 2025/0073924 | A1* | 3/2025 | Jiang | B25J 15/008 |
| 2025/0160253 | A1* | 5/2025 | Chen | A01D 46/30 |
| 2025/0243012 | A1* | 7/2025 | Long | A01D 46/005 |

FOREIGN PATENT DOCUMENTS

| | | |
|---|---|---|
| CN | 110125941 A | 8/2019 |
| CN | 110769988 A | 2/2020 |
| CN | 112850444 A | 5/2021 |
| CN | 114800584 A | 7/2022 |
| JP | H0747265 | 2/1995 |

OTHER PUBLICATIONS

Office Action (with English translation) received in corresponding Application No. CN 202310238008.0, dated Apr. 30, 2025, 13 pages.
Extended European Search Report received in corresponding Application No. EP 23926691.9, dated Feb. 19, 2026, 8 pages.
Notice of Allowance received in corresponding Application No. CN 202310238008.0, dated Jan. 26, 2026, 4 pages.

* cited by examiner

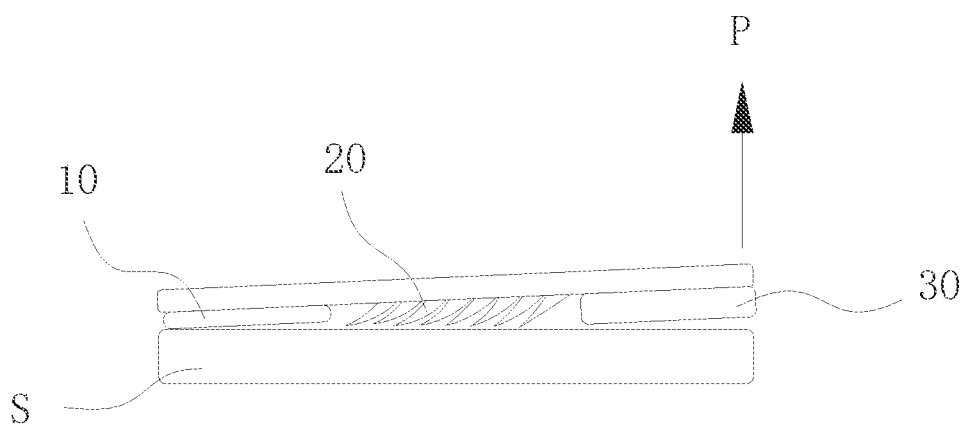
FIG. 4
FIG. 5A                    FIG. 5B
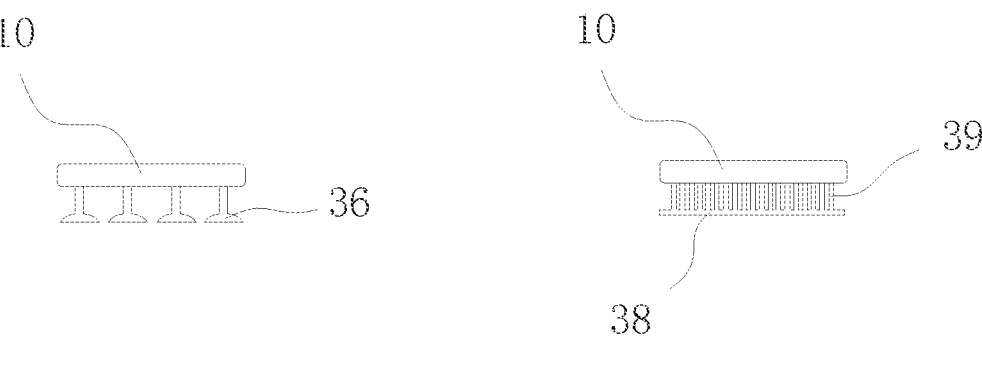
FIG. 5C                    FIG. 5D

ADHESION DEVICE AND ROBOT

CROSS-REFERENCE TO RELATED APPLICATIONS

The present application is a national stage phase of International Patent Application No. PCT/CN2023/080998 filed on Mar. 23, 2023, the content of which is expressly incorporated herein by reference in its entirety for all purposes.

TECHNICAL FIELD

The present disclosure relates to the technical field of industrial robots, in particular to an adhesion device and a robot having the adhesion device.

BACKGROUND

Grippers are often used as end effectors in robots to enable various activities such as grasping, staying, and climbing. Most grippers rely heavily on any normal clamping force to generate sufficient friction, but for fragile objects, excessive normal clamping force may deform or damage the object. To avoid these problems, grippers based on directional dry adhesives have emerged in recent years. Directional dry adhesives, inspired by the fibrous structure found on the feet of geckos and certain spiders, can be defined as materials with relatively high shear adhesion and relatively low peel strength while also having minimal stickiness. These materials can also be attached, detached and reattached to various objects to be attached many times.

Directional dry adhesives are known for minimal cohesion and large shear adhesion, but generally lack large normal adhesion.

SUMMARY

Accordingly, it is necessary to provide an adhesion device with high adhesion force and a robot having the adhesion device.

An adhesion device includes a substrate, an inner surface of the substrate being configured to be in contact with an object to be adhered; a directional dry adhesive layer provided on the inner surface of the substrate, the directional dry adhesive layer having a plurality of inclined micro-wedge structures; and an adhesion layer provided on the inner surface of the substrate and surrounding the directional dry adhesive layer.

In one of the embodiments, a thickness of the directional dry adhesive layer is greater than a thickness of the adhesion layer.

In one of the embodiments, the adhesion layer is a pressure-sensitive adhesive layer.

In one of the embodiments, the adhesion layer includes a plurality of micro-suction cups.

In one of the embodiments, the adhesion layer includes a plurality of mushroom-shaped tips.

In one of the embodiments, the adhesion layer includes a film and a plurality of fibers connecting the film and the inner surface.

An end effector of a robot includes a plurality of adhesion devices described in any one of the above and a loading member connected between the plurality of adhesion devices, the plurality of adhering devices are distributed symmetrically about a center of the loading member.

In one of the embodiments, both ends of the loading member are connected to the substrates of the plurality of adhesion devices respectively, and the loading member is configured to load the adhesion device in tangential and normal directions of a surface of the object to be adhered.

In one of the embodiments, the loading member includes any one of a tendon, a rope, a chain, a membrane or a combination thereof.

A robot includes the above-mentioned end effector.

The solution described above combines two types of adhesives, i.e., the directional dry adhesive layer and the adhesion layer. The adhesion device with combined adhesives can provide high adhesion force in all directions, while requiring minimal pressure to bond the dry adhesive layer to the object, thus achieving a good result.

BRIEF DESCRIPTION OF THE DRAWINGS

In order to more clearly explain the embodiments of the present disclosure or the technical solutions in the related art, the accompanying drawings that need to be used in the description of the embodiments or the related art will be briefly described below. It is obvious that the drawings in the following description are only the embodiments of the present disclosure. For those skilled in the art, other drawings can be obtained according to the disclosed drawings without paying creative labor.

FIG. 4 is a schematic view of the adhesion device shown in FIG. 1 being removed from the object to be adhered.

FIGS. 5A to 5D are enlarged views of the adhesion layer shown in FIG. 1 respectively.

DETAILED DESCRIPTION OF THE EMBODIMENTS

In order to make the above objects, features and advantages of the present disclosure more obvious and easier to understand, the specific embodiments of the present disclosure are described in detail below in combination with the accompanying drawings. Many specific details are set forth in the following description to facilitate a full understanding of the invention. However, the present disclosure can be implemented in many ways different from those described herein, and those skilled in the art can make similar improvements without violating the connotation of the invention. Therefore, the invention is not limited by the specific embodiments disclosed below.

In the present disclosure, unless otherwise expressly specified and limited, the terms "mount", "connect", "contact", "fix" and other terms should be understood in a broad sense, for example, they can be fixed connections, removable connections, or integrated. It can be mechanical connection or electrical connection. It can be directly connected or indirectly connected through an intermediate medium. It can be the connection within two elements or the interaction relationship between two elements, unless otherwise expressly limited. For those skilled in the art, the specific meaning of the above terms in the present disclosure can be understood according to the specific situation.

It should be noted that when an element is called "fixed to" or "provided on" another element, it can be directly on another element or there can be a centered element. When an element is considered to be "connected" to another element, it can be directly connected to another element or there may be intermediate elements at the same time. The terms "vertical", "horizontal", "up", "down", "left", "right" and similar expressions used herein are for the purpose of illustration only and do not represent the only embodiment.

Figure 1:
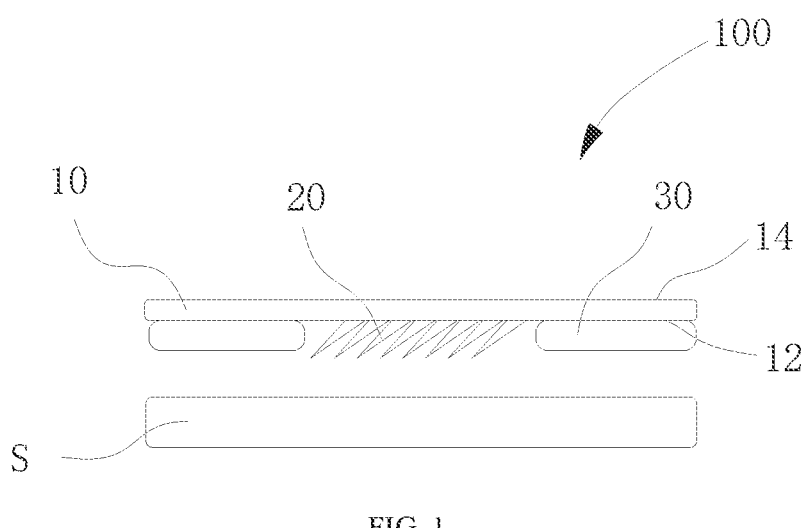
FIG. 1 is a schematic view of an adhesion device according to an embodiment.

Referring to FIG. 1, an embodiment of the present disclosure provides an adhesion device 100, which includes a substrate 10, a directional dry adhesive layer 20, and an adhesion layer 30. The substrate 10 includes an inner surface 12 that is in contact with an object to be adhered (S) and an outer surface 14 that is connected to an articulation member of a robot. Both the directional dry adhesive layer 20 and the adhesion layer 30 are provided on the inner surface 12.

Figure 2:
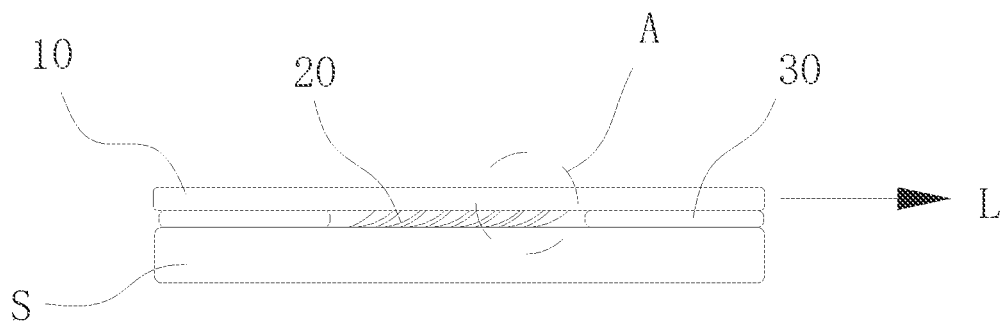
FIG. 2 is a schematic view of the adhesion device shown in FIG. 1 acting on an object to be adhered.
Figure 3:
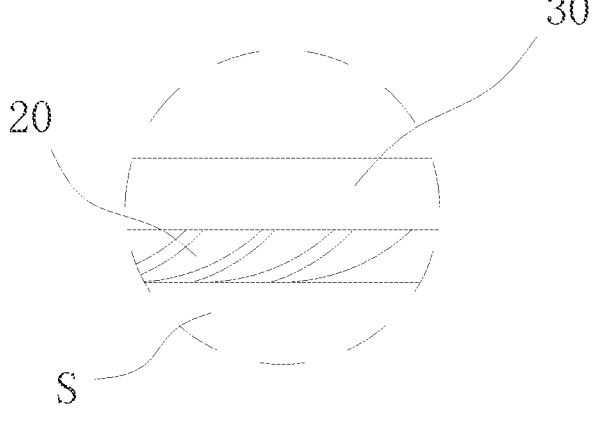
FIG. 3 is an enlarged view of part A in FIG. 2.

As shown in FIGS. 2 and 3, the directional dry adhesive layer 20 has a plurality of inclined micro-wedge structures. The micro-wedge structures may be inclined in a direction opposite to a main manipulation direction of the adhesion device 100. In some embodiments, each micro-wedge structure includes a first inclined surface and a second inclined surface, a bottom of the first inclined surface is connected to a bottom of the second inclined surface to form a protruding tip. In an embodiment, an angle between the first inclined surface and a vertical plane is 50° to 80°, an angle between the second inclined surface and the vertical plane is 20° to 60°, and a height of the micro-wedge structure in a vertical direction is 40 µm to 200 µm. The micro-wedge structures may be integrally molded with the substrate 10 through a mold, or can be formed individually and then adhered on the inner surface 12 of the substrate 10 through glue, etc. In other embodiments, a shape and a size of each micro-wedge structure can also be adjusted according to actual needs.

The adhesion layer 30 surrounds the directional dry adhesive layer 20. The adhesion layer 30 can be designed into many different forms. For example, referring to FIGS. 5A to 5C, in these embodiments, the adhesion layer 30 may include a pressure-sensitive adhesive layer (e.g., transparent adhesive) 32, a plurality of micro-suction cups 34, and a plurality of mushroom-shaped tips 36, respectively. The adhesion layer with the mushroom-shaped tips has greater load capacity in a normal direction than that of the similar products with flat head and may have higher adhesive strength and preload ratio. In another embodiment, as shown in FIG. 5D, the adhesion layer 30 may further include a film 38 and a plurality of fibers 39 connecting the film 38 and the inner surface 12. A height of the fiber 39 may be, for example, from about 1 micron to 100 microns. A width-to-length ratio of the fiber can be from about 1:1 to about 5:1. A shape and/or a cross-section of the fiber may be, for example, substantially circular, oval, hexagonal or rectangular. In one exemplary embodiment, polydimethylsiloxane (PDMS) with the trade name Sylgard® 184 (e.g., commercial available from Dow Chemical) can be used to form a specific structure of the adhesion layer 30.

A thickness of the directional dry adhesive layer 20 is greater than a thickness of the adhesion layer 30, so that when the directional dry adhesive layer 20 is just in contact with a surface of the object to be adhered (S), the adhesion layer 30 will not be in contact with the object to be adhered (S). At this time, an adhesion mechanism of the micro-wedge structure of the directional dry adhesive layer 20 is the van der Waals force effect. When no tangential load is applied, the micro-wedge structure is only slightly inclined, and only the tips are in contact with the surface of the object to be adhered (S). In this state, the van der Waals force may be negligible, and the micro-wedge structure is in a deactivate state.

As shown in FIG. 2, when the substrate 10 exerts a certain downward pressure on the object to be adhered (S), the micro-wedge structure of the directional dry adhesive layer 20 will deform elastically, which enables the adhesion layer 30 to be in contact with the object to be adhered (S). When a shear force L is applied to the substrate 10, the micro-wedge structure of the directional dry adhesive layer 20 will be gradually bent and activated by a force. As the micro-wedge structure is gradually activated, a contact area between the micro-wedge structure and the surface of the object to be adhered (S) increases significantly. Since a normal adhesion is proportional to the contact area between the micro-wedge structure and the surface of the object, the normal adhesion also increases significantly. In addition, when the substrate 10 is preloaded in a shear direction, the directional dry adhesive layer 20 is bonded to the surface of the object to be adhered (S), so as to enable the substrate 10 to be closer to the surface of the object to be adhered (S). A normal pressure is further applied to the adhesion layer 30, so that the adhesion layer 30 is bonded to the surface of the object to be adhered (S). If the preload is kept, the adhesion layer 30 can be stably bonded to the surface of the object to be adhered (S), so that loads in all directions can be applied to the substrate 10 to ensure that the adhesion layer 30 has a very strong adhesion.

When the adhesion device 100 is removed from the surface of the object to be adhered (S), a shear preload can be released, and the directional dry adhesive layer 20 will rebound to an original undeformed state, so that the micro-wedge structure of the directional dry adhesive layer 20 no longer abuts against the surface of the object to be adhered (S), while only the tips are in contact with the object to be adhered (S), and the normal adhesion is negligible and the micro-wedge structure is in the deactivate state. When an area of the directional dry adhesive layer 20 is much greater than an area of the adhesion layer 30, the rebound of the directional dry adhesive layer 20 can also enable the adhesion layer 30 to bounce off the surface of the object to be adhered (S). In other words, when the shear preload is removed, the entire adhesion device 100 will be automatically peeled off from the object to be adhered (S).

As shown in FIG. 4, when the area of the adhesion layer 30 is relatively large, a resilience of the directional dry adhesive layer 20 may not be large enough to peel off the adhesion layer 30 from the surface of the object to be adhered (S). At this time, a peeling force P can be actively applied to an edge of the substrate 10 to enable an end of the substrate 10 to be lifted, so that the adhesion layer 30 can be manually peeled off from the surface of the object to be adhered (S). In this case, the preload of shear does not necessarily need to be kept at all times during loading.

The directional dry adhesive layer 20 can provide greater normal and shear adhesion, but require greater pressure to be activated. On the other hand, the adhesion layer 30 has small bonding force and large shear adhesion capacity, but usually lacks large normal adhesion. By combining the two types of adhesives in the above embodiment, the adhesion device 100 can provide high adhesion in all directions while requiring minimal pressure to bond the dry adhesive layer to the object, thus achieving a good result.

Figure 6:
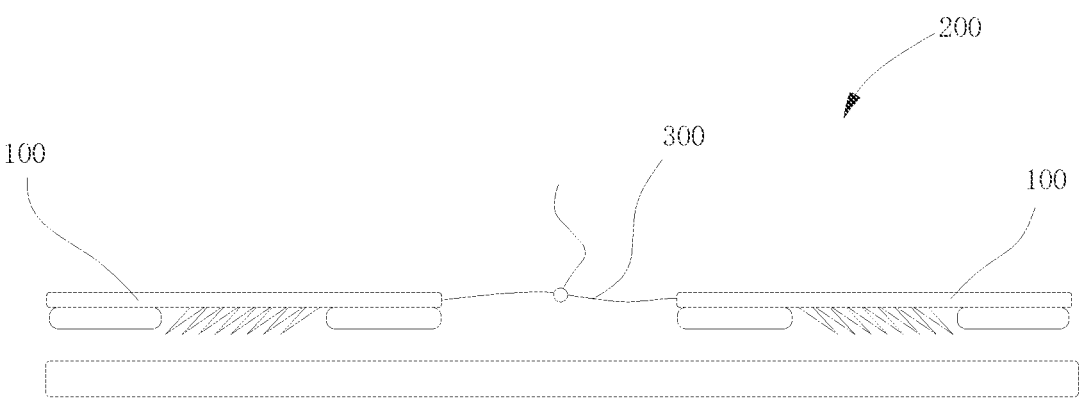
FIG. 6 is a schematic view of an end effector according to an embodiment.

As shown in FIG. 6, another embodiment of the present disclosure provides an end effector 200 of a robot, which includes a plurality of adhesion devices 100 according to aforementioned embodiments and a loading member 300 connected between the adhesion devices 100. The plurality of adhesion devices 100 are provided symmetrically about a center of the loading member 300. In this embodiment, inclination directions of the micro-wedge structures of the two opposite adhesion devices 100 are opposite.

Figure 7:
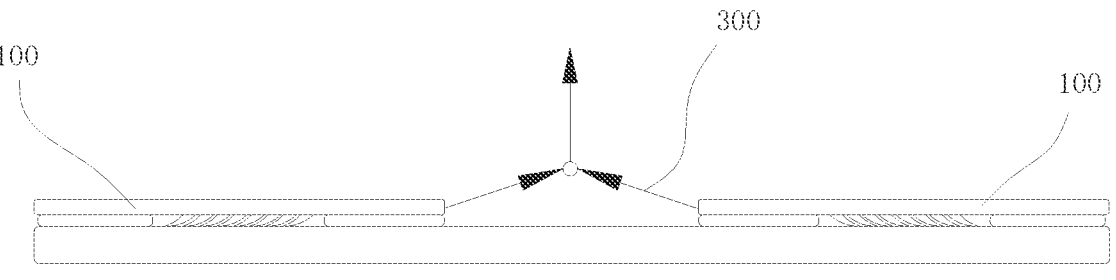
FIG. 7 is a schematic view of the end effector shown in FIG. 6 acting on the object to be adhered.

The loading member 300 may include, but is not limited to, a tendon, a rope, a chain, a membrane, or a combination thereof. Once tensioned, the loading member 300 may be substantially inextensible. The loading member 300 may be made of, for example, polyimide, Kevlar and/or polyester (PET). Both ends of the loading member 300 are connected to the substrates 10 of two adjacent adhesion devices 100, respectively. Referring to FIG. 7, by arranging the loading member 300 between two opposite adhesion devices 100, a force can be applied upwards to a middle of the loading member 300. In this case, the loading member 300 is configured to load the two adhesion devices 100 in the tangential and normal directions of the surface of the object to be adhered (S). Since the inclination directions of the micro-wedge structures of the two opposite adhesion devices 100 are opposite, and the inclination direction of each micro-wedge structure is opposite to a direction of a force applied by the loading member 300 to the substrate 10, so that shear force can be preloaded to two directional dry adhesive layers 20 simultaneously.

Figure 8:
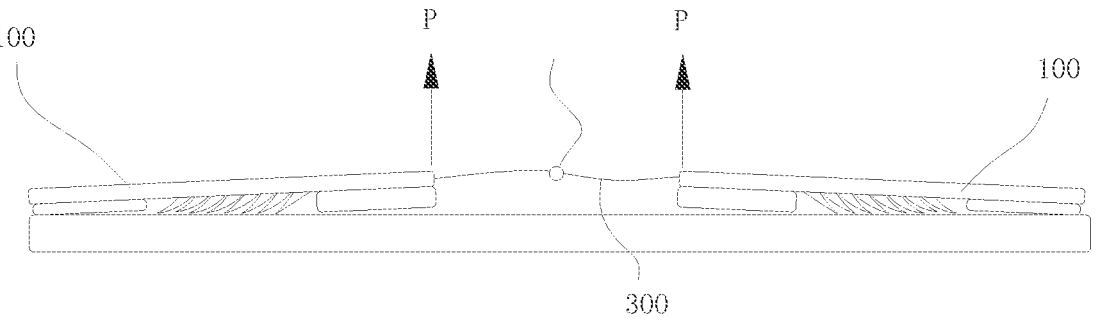
FIG. 8 is a schematic view of the end effector shown in FIG. 6 being removed from the object to be adhered.

As similar to the previous embodiments, during a loading stage, an external load can be applied through the two substrates 10 to ensure that the adhesion layer 30 has a very strong adhesion force. During an unloading stage, when the resilience of the directional dry adhesive layer 20 is large enough to overcome the adhesion force of the adhesion layer 30, the entire end effector 200 will be automatically peeled off from the object to be adhered (S) when the shear preload is released. When the resilience of the directional dry adhesive layer 20 is not large enough to peel off the adhesion layer 30 from the surface of the object to be adhered (S), as shown in FIG. 8, a force can be applied to one end of the substrate 10 to lift it up, so as to assist its peeling off from the surface of the object to be adhered (S). Similarly, in this case, the shear preload does not necessarily need to be kept at all times during loading.

The directional dry adhesive layer 20 itself is easily to be bonded to the object, but it cannot provide strong adhesion. The adhesion layer 30 can provide strong adhesion, but it requires a relatively high initial pressure when bonded to the object. The above embodiments combine the two adhesives and has the advantages of both. That is, the end effector 200 combining the directional dry adhesive layer 20 with the adhesion layer 30 is not only easy to be bonded, but also can provide strong adhesion, so that the disadvantages of the directional dry adhesive layer 20 or the adhesion layer 30 are eliminated.

Figure 9:
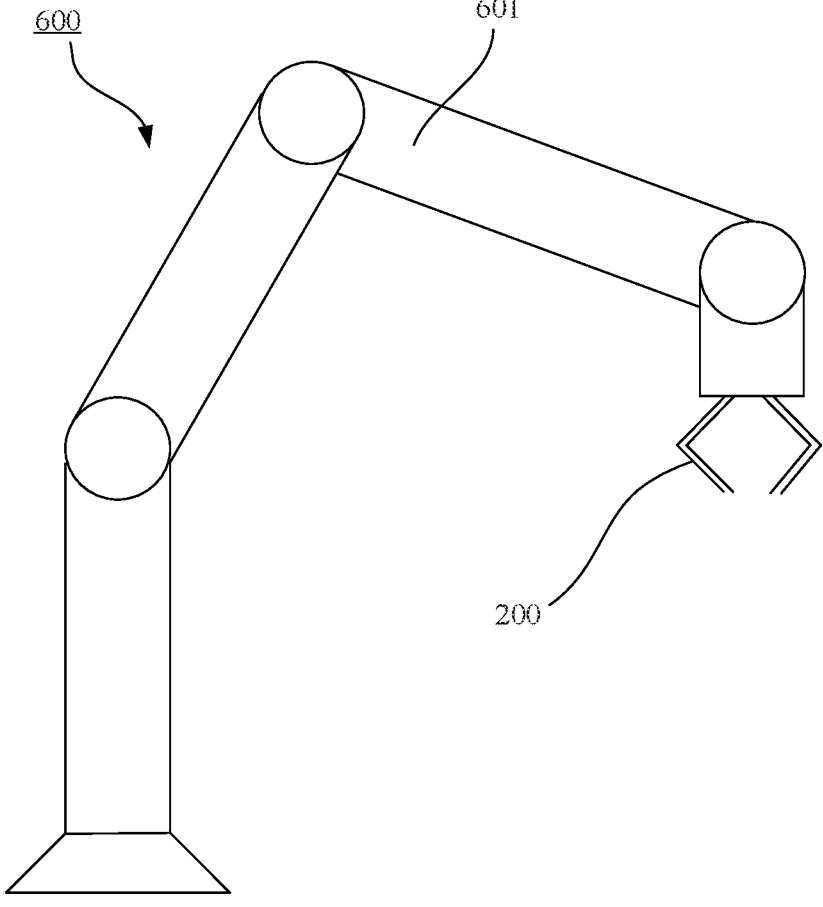
FIG. 9 is a schematic view of a robot according to an embodiment.
Figure 10:
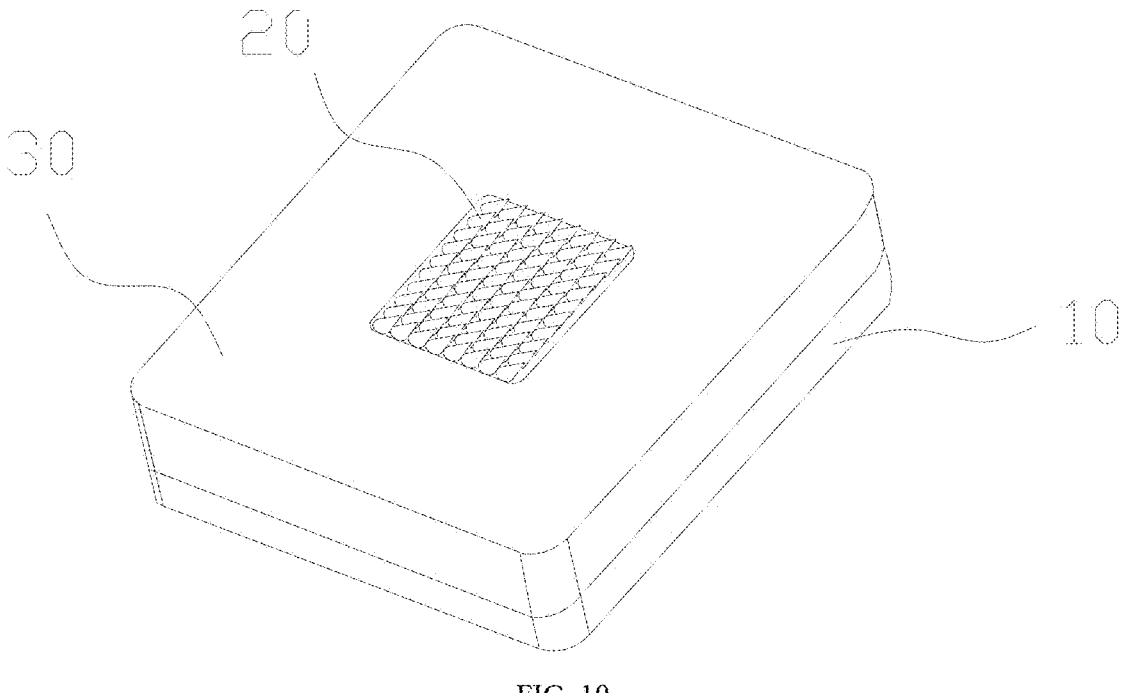
FIG. 10 is a perspective view of an adhesion layer surrounding a directional dry adhesive layer in accordance with an exemplary embodiment of the present disclosure.

Referring to FIG. 9, according to an embodiment, a robot 600 is also provided. The robot 600 may include a plurality of articulation members 601 and an end effector 200 connected to an end of the articulation member 601. The robot 600 has broad application prospects in the field of picking and handling products such as ultra-thin wafers, ultra-thin glass, flexible circuit boards, wearable products, etc. Those skilled in the art should understand that the structure shown in FIG. 6 is only an exemplary embodiment of the robot 600. In other embodiments, the robot 600 may include more components or fewer components, such as I/O devices, network access devices, communication buses, processors, memory, actuators and sensors, etc. For example, the robot 600 may include a processor and memory storing instructions that, when executed by the processor, enable the processor to implement a control system. The memory may also store instructions that, when executed by the processor, enable the processor to activate or deactivate the end effector 200 in order to grasp or release the object to be adhered.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure

What is claimed is:

1. An adhesion device, comprising:
   a substrate, an inner surface of the substrate being configured to be in contact with an object to be adhered;
   a directional dry adhesive layer provided on the inner surface of the substrate, the directional dry adhesive layer having a plurality of inclined micro-wedge structures; and
   an adhesion layer provided on the inner surface of the substrate and surrounding the directional dry adhesive layer;
   wherein the adhesion layer comprises a film and a plurality of fibers connecting the film and the inner surface.

2. The adhesion device according to claim 1, wherein a thickness of the directional dry adhesive layer is greater than a thickness of the adhesion layer.

3. The adhesion device according to claim 1, wherein the adhesion layer is a pressure-sensitive adhesive layer.

4. The adhesion device according to claim 1, wherein the adhesion layer comprises a plurality of micro-suction cups.

5. The adhesion device according to claim 1, wherein the adhesion layer comprises a plurality of mushroom-shaped tips.

6. An end effector of a robot, comprising a plurality of adhesion devices according to claim 1 and a loading member connected between the plurality of adhesion devices, wherein the plurality of adhering devices are distributed symmetrically about a center of the loading member.

7. The end effector according to claim 6, wherein both ends of the loading member are connected to the substrates of the plurality of adhesion devices respectively, and the loading member is configured to load the adhesion device in tangential and normal directions of a surface of the object to be adhered.

8. The end effector according to claim 6, wherein the loading member comprises any one of a tendon, a rope, a chain, a membrane or a combination thereof.

9. The end effector according to claim 6, wherein a thickness of the directional dry adhesive layer is greater than a thickness of the adhesion layer.

10. The end effector according to claim 6, wherein the adhesion layer is a pressure-sensitive adhesive layer.

11. The end effector according to claim 6, wherein the adhesion layer comprises a plurality of micro-suction cups.

12. The end effector according to claim 6, wherein the adhesion layer comprises a plurality of mushroom-shaped tips.

13. A robot, comprising the end effector according to claim 6.

14. The robot according to claim 13, wherein both ends of the loading member are connected to the substrates of the plurality of adhesion devices respectively, and the loading member is configured to load the adhesion device in tangential and normal directions of a surface of the object to be adhered.

15. The robot according to claim 13, wherein the loading member comprises any one of a tendon, a rope, a chain, a membrane or a combination thereof.

16. The robot according to claim 13, wherein a thickness of the directional dry adhesive layer is greater than a thickness of the adhesion layer.

17. The robot according to claim 13, wherein the adhesion layer comprises a plurality of mushroom-shaped tips.

* * * * *